Figure 1:
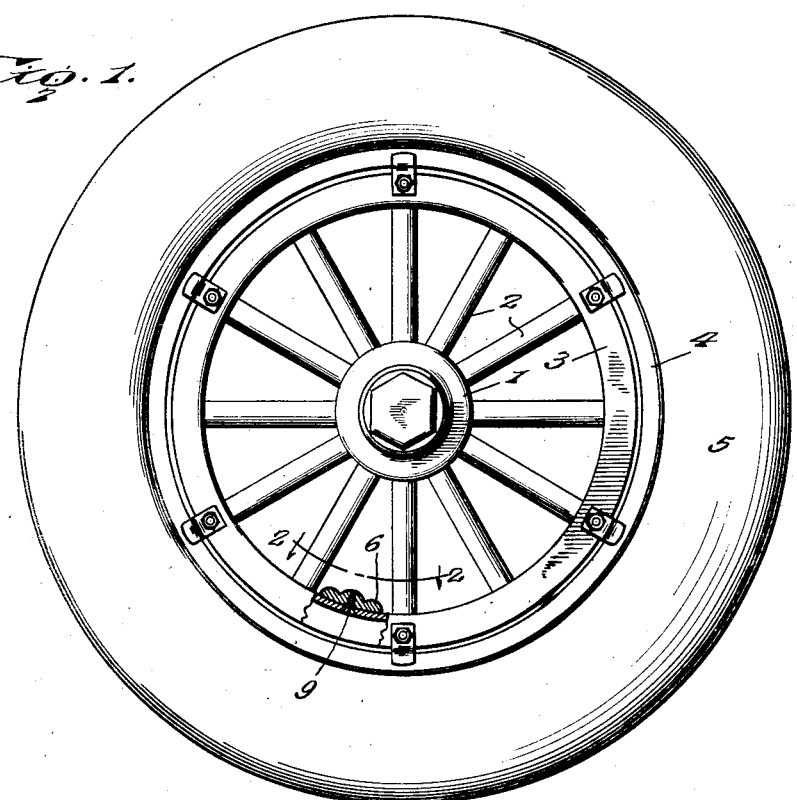

June 6, 1933.  C. H. PHELPS  1,912,496
WHEEL BALANCING MEANS
Filed Sept. 21, 1931

Inventor
C. H. Phelps.
By Lacey & Lacey, Attorneys

Patented June 6, 1933

1,912,496

UNITED STATES PATENT OFFICE

CLYDE H. PHELPS, OF MOUNT VERNON, NEW YORK, ASSIGNOR TO RIESS MANUFACTURING COMPANY, OF KOKOMO, INDIANA, A CORPORATION OF INDIANA

WHEEL-BALANCING MEANS

Application filed September 21, 1931. Serial No. 564,194.

In the manufacture of vehicle wheels, it sometimes happens that the weight is unequally distributed and this unequal distribution of the weight produces a heavy spot which causes uneven wear upon the wheel and upon the tire mounted thereon and also causes the wheel to shimmy when the vehicle is driven at any considerable speed so that the steering of the vehicle is difficult and the occupants of the vehicle are caused considerable discomfort. The unequal distribution of the weight in a vehicle wheel may be caused by the application of a heavy tire patch to the tire and various other causes operate to produce a wheel which is not properly balanced.

The object of the present invention is to provide a simple, inexpensive and easily applied device whereby the lack of balance in a wheel may be effectually overcome and the wheel restored to perfect balance. The invention is illustrated in the accompanying drawing and will be hereinafter first fully described and then more particularly defined in the appended claims.

Figure 2:
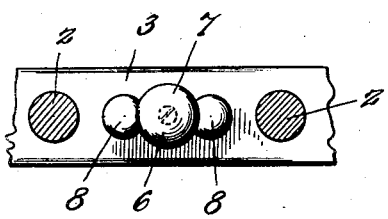
Figure 3:
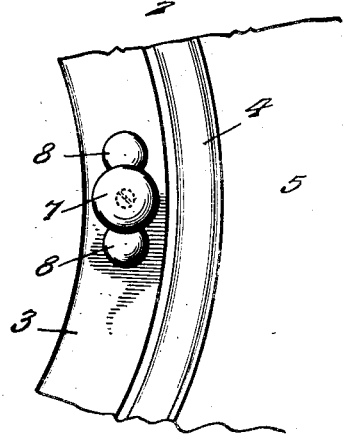
Figure 4:
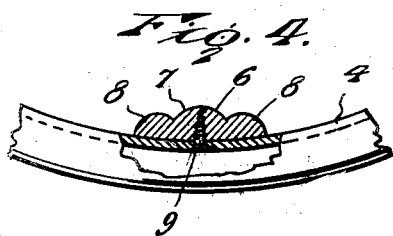

In the drawing:

Figure 1 is a side elevation, partly broken away and in section, of a wheel having the invention applied thereto, Fig. 2 is a detail enlarged section on the line 2—2 of Fig. 1, Fig. 3 is an elevation showing a slightly different application of the invention, Fig. 4 is a detail view, partly in elevation and partly in section, showing the application of the device to the rim of a wheel.

The wheel may be of any preferred type and is illustrated as comprising a hub 1, spokes 2 extending from the hub and a felly 3 carried by the outer ends of the spokes. In Fig. 1 of the drawing there is also shown a rim 4 mounted upon the felly and equipped with a tire 5.

The device of the present invention comprises a soft metal plate 6 which is shown as consisting of three lobes or spherical elements cast in one body, the intermediate lobe 7 being larger than the end lobes 8, as clearly shown. The device is preferably molded or cast of lead or some other similar metal which may be easily cut or separated into portions, accordingly as more or less weight is to be added to the wheel. The formation of the body or plate into three lobes, as shown and described, facilitates the separation of the same into parts of the desired weight inasmuch as the juncture of adjacent lobes will define a dividing point and present recesses or notches which may be readily engaged by the edge of a chisel or similar tool. The plate or body is formed with a central opening which is internally threaded and adapted to receive a securing screw, indicated at 9.

When a wheel is thought to be out of balance, the vehicle is supported upon jacks so that the wheel may rotate freely, clear of the ground. The heavy spot in the wheel will, of course, gravitate to the low point so that when the wheel comes to rest, it will be known what part of the wheel is the heaviest and one of the devices of my invention is then applied to the wheel at a diametrically opposite point of the same. As shown in Figs. 1 and 2, the weight is secured upon the inner circumference of the felly 3 and the entire weight is employed. If less weight is deemed sufficient, either end lobe, or both, may be cut off and only the central lobe employed, or the central lobe and one end lobe. In Fig. 3, the counterbalance weight is shown applied to the side of the felly and in Fig. 4, it is shown applied to the inner circumference of the rim in which event it will be housed by the hollow felly and will not be noticeable so that, to all appearances, the wheel will be free of any unusual devices. Of course, the weight may be secured upon the outer circumference of the felly and may be secured upon either side of the felly, as shown in Fig. 3. If necessary, in order to attain perfect balance, more than one weight may be applied to the wheel and they may be applied at such points around the circumference of the wheel as judgment and experience may dictate.

It will be very readily noted that I have provided an exceedingly simple and inexpensive device which may be easily applied to any wheel and will overcome and counteract any tendency of the wheel to get out of balance through use. The formation of the weight into lobes gives it a somewhat ornamental appearance so that even when applied to the side of the wheel or when applied in lots of two or more, it will not detract from the sightliness of the wheel but will rather add thereto.

Having thus described the invention, I claim:

1. As a new article of manufacture, a counter-balance for wheels comprising a metal body having its lower face flat and its upper face and side walls notched to form normally connected central and side lobes of unequal weight, the central lobe being of greater weight than the side lobes and adapted to receive a securing element, said notches defining weakened portions between the lobes whereby either or both side lobes may be readily detached from the central lobe.

2. As a new article of manufacture, a counter-balance for wheels comprising a soft metal body having its lower face shaped to conform to and adapted to bear against the rim of a wheel and its upper face and side walls notched to form substantially circular normally connected central and side lobes of unequal weight, the central lobe being of greater weight than the side lobes to permit an attaching screw to be inserted through the wheel rim and into said central lobe from the bottom thereof for holding the counter-balance rigidly in position on the wheel rim, said notches defining weakened portions between the lobes whereby either or both side lobes may be readily detached from the central lobe without disturbing said central lobe or said fastening screw.

In testimony whereof I affix my signature.

CLYDE H. PHELPS. [L. S.]